United States Patent
Lee et al.

(10) Patent No.: US 7,636,405 B2
(45) Date of Patent: Dec. 22, 2009

(54) APPARATUS AND METHOD FOR CALIBRATING IN-PHASE AND QUADRATURE-PHASE MISMATCH

(75) Inventors: Chao-Cheng Lee, Hsin-Chu (TW);
Ying-Yao Lin, Hsin-Chu Hsien (TW);
Ying-Hsi Lin, Hsin-Chu (TW)

(73) Assignee: Realtek Semiconductor Corp., HsinChu (TW)

( * ) Notice: Subject to any disclaimer, the term of this patent is extended or adjusted under 35 U.S.C. 154(b) by 682 days.

(21) Appl. No.: 10/908,109

(22) Filed: Apr. 28, 2005

(65) Prior Publication Data

US 2005/0180532 A1    Aug. 18, 2005

Related U.S. Application Data

(63) Continuation-in-part of application No. 10/905,496, filed on Jan. 7, 2005.

(30) Foreign Application Priority Data

| Jan. 9, 2004 | (TW) | ............................. 93100570 A |
| Apr. 30, 2004 | (TW) | ............................. 93112124 A |
| May 10, 2004 | (TW) | ............................. 93113093 A |

(51) Int. Cl.
*H04L 1/00* (2006.01)
(52) U.S. Cl. .................. 375/346; 375/316; 455/130; 455/296
(58) Field of Classification Search .................. 375/324, 375/316, 346
See application file for complete search history.

(56) References Cited

U.S. PATENT DOCUMENTS 4,789,897 A   12/1988   Kappeler et al.

(Continued)

FOREIGN PATENT DOCUMENTS

CN    1035746 A    9/1989

(Continued)

OTHER PUBLICATIONS

Behzad Razavi, "Design Considerations for Direct-Conversion Receivers", Jun. 1997, pp. 428-435, vol. 44, No. 6, IEEE Transactions on Circuits and Systems-II: Analog and Digital Signal Processing.

(Continued)

*Primary Examiner*—Shuwang Liu
*Assistant Examiner*—Leon Flores
(74) *Attorney, Agent, or Firm*—Winston Hsu

(57) ABSTRACT

A method and device for calibrating in-phase and quadrature-phase (IQ) mismatch. The device is used in a direct down-conversion circuit of a communication system. The device has a first mixer for mixing an RF signal with a first carrier signal, so as to generate an in-phase analog signal; a second mixer for mixing the RF signal with a second carrier signal, so as to generate a quadrature-phase analog signal; an operation unit for executing a Least Mean Square (LMS) algorithm and thereby generating a compensation signal according to the in-phase analog signal and the quadrature-phase analog signal; and a calibration unit for compensating the in-phase analog signal and the quadrature-phase analog signal according to the compensation signal, so as to calibrate the IQ mismatch between the in-phase analog signal and the quadrature-phase analog signal.

20 Claims, 3 Drawing Sheets

U.S. PATENT DOCUMENTS

| | | | | |
|---|---|---|---|---|
| 5,111,155 | A | * | 5/1992 | Keate et al. .................. 330/149 |
| 5,705,949 | A | | 1/1998 | Alelyunas et al. |
| 5,825,807 | A | | 10/1998 | Kumar |
| 6,009,317 | A | | 12/1999 | Wynn |
| 6,330,290 | B1 | * | 12/2001 | Glas ........................... 375/324 |
| 6,707,858 | B1 | * | 3/2004 | Davie .......................... 375/316 |
| 2002/0057752 | A1 | * | 5/2002 | Denno ......................... 375/346 |
| 2002/0097812 | A1 | * | 7/2002 | Wiss ........................... 375/316 |
| 2003/0031273 | A1 | * | 2/2003 | Mohindra ................... 375/324 |
| 2003/0206603 | A1 | * | 11/2003 | Husted ....................... 375/324 |
| 2003/0231723 | A1 | | 12/2003 | Hansen |

FOREIGN PATENT DOCUMENTS

WO    WO 2004/008629 A1    1/2004

OTHER PUBLICATIONS

Isis Mikhael et al., "Adaptive Iq Mismatch Cancellation for Quadrature If Receivers".

Kong-Pang Pun et al.,"Circuit Design For Wireless Communications", pp. 161-163, ISBN1-4020-7415-8, Kluwer Academic Publishers, Netherlands.

Zhang Xinggan et al, "Implementation of the Corrector of Errors in I& Q Channels With DSP", Journal of Electronics vol. 21 No. 3, May 1999.

* cited by examiner

APPARATUS AND METHOD FOR CALIBRATING IN-PHASE AND QUADRATURE-PHASE MISMATCH

CROSS REFERENCE TO RELATED APPLICATIONS

This is a continuation-in-part of U.S. application Ser. No. 10/905,496, which was filed on Jan. 7, 2005 and is included herein by reference.

BACKGROUND OF INVENTION

1. Field of the Invention

The present invention relates to an apparatus and a method for calibrating signals, and more particularly, to an apparatus and a method for calibrating mismatch between in-phase and quadrature-phase signals.

2. Description of the Prior Art

FIG. 1 is a diagram showing a conventional zero-IF receiver 10. The zero-IF receiver 10 includes an antenna 11, a low noise amplifier (LNA) 12, mixers 14 and 24, low pass filters (LPFs) 16 and 26, analog to digital converters (ADCs) 18 and 28, and a digital signal processor (DSP) 19. Antenna 11 receives a radio signal, and LNA 12 amplifies the radio signal. Mixer 14 mixes the radio signal with a first carrier wave($COS\omega_c t$ in FIG. 1), so as to generate an analog signal $S_{a1}$. The other mixer 24 mixes the radio signal with a second carrier wave ($SIN(\omega_c t+\delta)$ in FIG. 1), so as to generate an analog signal $S_{a2}$. LPFs 16,26 filter out high frequency components of the analog signals $S_{a1}$, $S_{a2}$, respectively. Additionally, ADCs 18,28 convert the analog signals $S_{a1}$ and $S_{a2}$ to corresponding digital signals $S_{d1}$ and $S_{d2}$, respectively, and DSP 19 further processes the digital signals $S_{d1}$ and $S_{d2}$.

Ideally, there should be a 90° phase difference between the above-mentioned first carrier wave and the second carrier wave for generating analog signals $S_{a1}$ and $S_{a2}$ with quadrature relation (i.e., an in-phase signal and a quadrature-phase signal). However, in actual apparatus, temperature variation, process variation, and drift of supplied power may cause a phase offset $\delta$ between the first carrier wave and the second carrier wave such that the phase difference can't be ideal. This problem is called IQ mismatch.

IQ mismatch influences demodulation of signals and thereby increases the bit error rate in a communication system. Therefore, it is needed to compensate for the above-mentioned phase offset $\delta$, so as to correct the analog signals $S_{a1}$, $S_{a2}$ and increase the bit rate of the communication system.

There are two typical calibration methods for solving the IQ mismatch in a zero-IF receiver. One is to generate a phase difference signal by measuring the phase offset $\delta$ of the digital signals $S_{d1}$ and $S_{d2}$ and then generate a calibration signal according to the phase difference signal for compensating for the phase offset $\delta$ of the analog signals $S_{a1}$ and $S_{a2}$. The other is also to generate a phase difference signal by measuring the phase offset $\delta$ of the digital signals Sd1 and Sd2 but generate a calibration signal according to the phase difference signal for compensating for the phase offset $\delta$ of the digital signals Sd1 and Sd2.

The above-mentioned methods both measure the phase offset $\delta$ of digital signals $S_{d1}$, $S_{d2}$ by utilizing a digital circuit of a DSP executing a Discrete Fourier Transform (DFT) on the digital signals $S_{d1}$, $S_{d2}$. Besides, phase compensation is done to the analog signals Sa1 and Sa2 by executing a Gram-Schmidt orthogonal procedure or done to the digital signals Sd1 and Sd2 by utilizing the digital circuit executing a LMS (Least-Mean-Square) algorithm. The related prior art are disclosed by the reference "Adaptive IQ mismatch cancellation for quadrature IF receiver", Isis Mikhael, Wasfy. B. Mikhael, http://bruce.engr.ucf.edu/%7Eprp/paper6.

SUMMARY OF INVENTION

Therefore, it is an objective of the claimed invention to provide a calibration device and method to solve the above-mentioned IQ mismatch.

According to an embodiment of the claimed invention, a calibrating method for IQ mismatch comprises the following steps: respectively mixing an RF signal with a first and a second carrier signals for generating an in-phase analog signal and a quadrature-phase analog signal; executing a Least Mean Square (LMS) algorithm for generating a compensation signal according to the in-phase analog signal and the quadrature-phase analog signal; and compensating for the in-phase analog signal and quadrature-phase analog signal according to the compensation signal, so as to calibrate IQ mismatch between the in-phase analog signal and quadrature-phase analog signal.

According to an embodiment of the claimed invention, an IQ mismatch calibration device comprises a first mixer for mixing an RF signal with a first carrier signal to generate an in-phase analog signal; a second mixer for mixing the RF signal with a second carrier signal to generate a quadrature-phase analog signal; an operation unit for executing a Least Mean Square (LMS) algorithm to generate a compensation signal according to the in-phase and quadrature-phase analog signals; and a calibration unit for calibrating IQ mismatch between the in-phase analog signal and the quadrature-phase analog signal according to the compensation signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
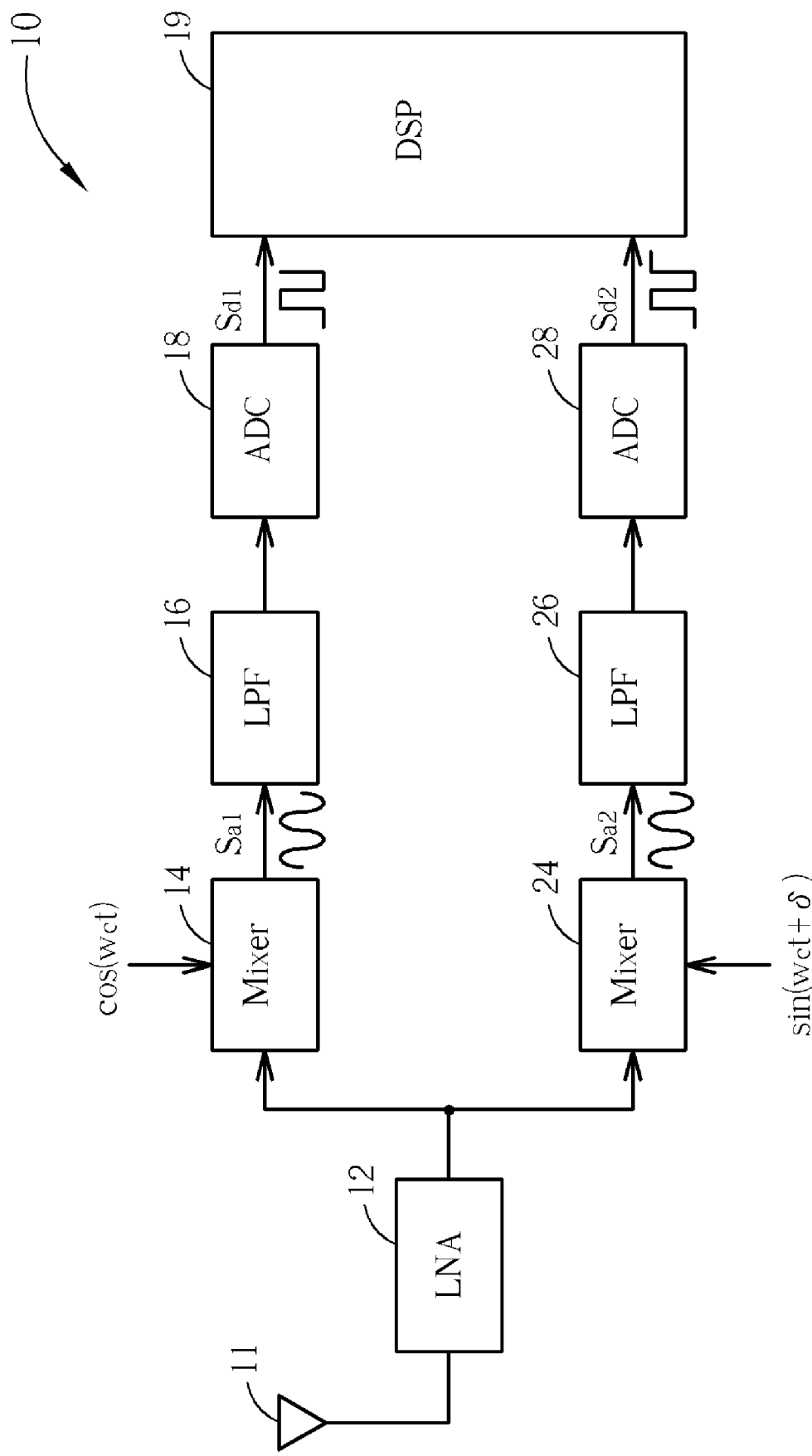
FIG. 1 is a diagram of a conventional zero-IF receiver.
Figure 2:
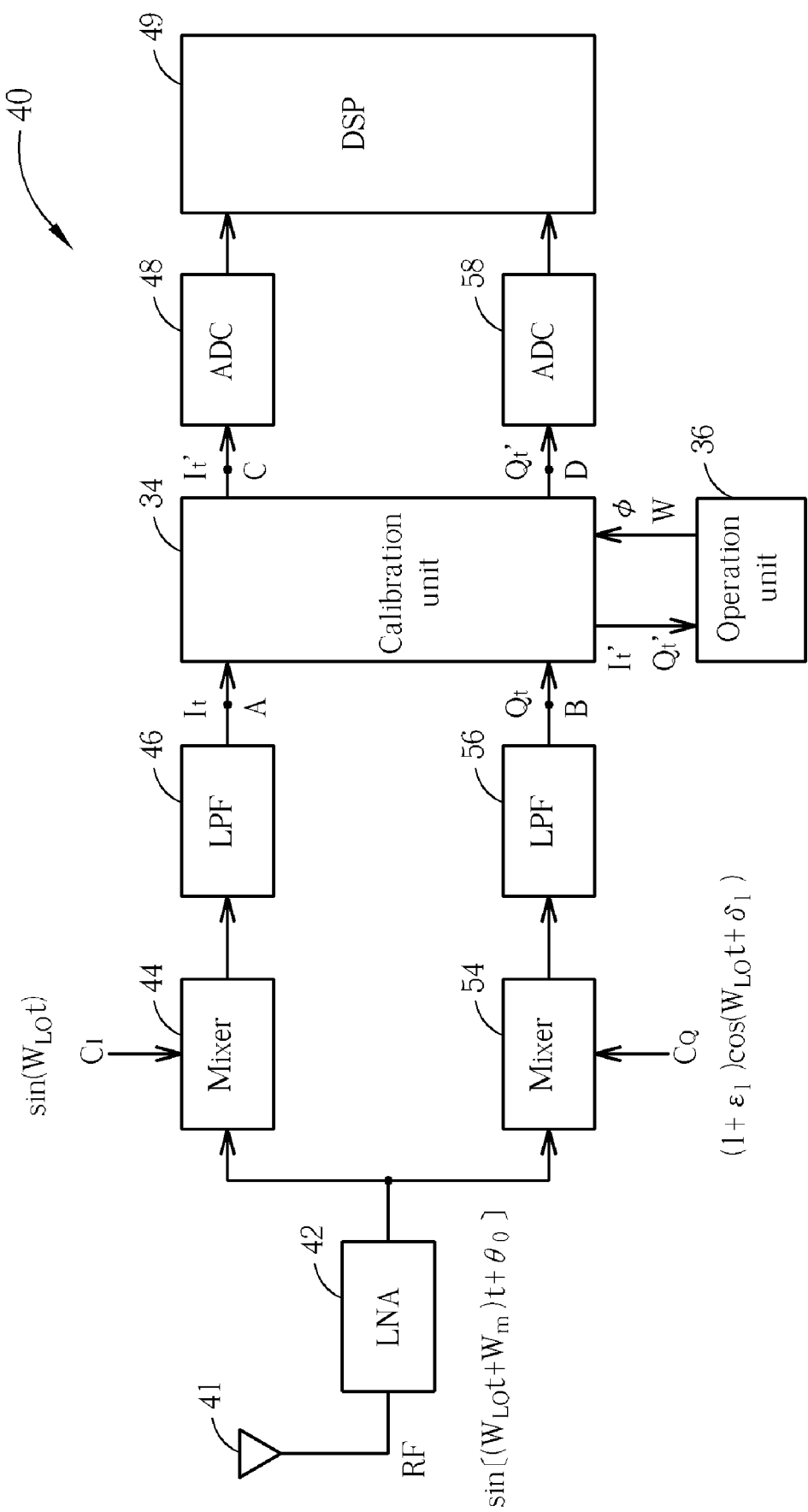
FIG. 2 is a diagram of a zero-IF transceiver according to an embodiment of the present invention.

Please refer to FIG. 2. FIG. 2 is a diagram of a zero-IF transceiver 40 according to an embodiment of the present invention. The zero-IF transceiver 40 comprises an antenna 41, a low noise amplifier (LNA) 42, mixers 44 and 54, and low pass filters (LPFs) 46 and 56. Because the general operation of the zero-IF transceiver 40 is known to a person of ordinary skill in the art, further description about the operation is omitted herein for the sake of brevity. Please note that the mixer 44 utilizes the first carrier wave $C_1$ for directly converting the RF signal to generate an in-phase analog signal $I_r$. Additionally, the mixer 54 utilizes the second carrier wave $C_Q$ for directly converting the RF signal to generate a quadrature-phase analog signal $Q_r$. In the present invention, the zero-IF transceiver 40 further comprises an operation unit 36 for measuring the gain and phase mismatch between the in-phase analog signal $I_r$ and the quadrature-phase analog signal $Q_r$ and a calibration unit 34 for calibrating the gain mismatch and the phase mismatch between the in-phase analog signal $I_r$ and the quadrature-phase analog signal $Q_t$ according to the measuring result. Accordingly, a corrected in-phase analog signal $I_t'$ and a corrected quadrature-phase analog signal $Q_t'$ are generated by the calibration unit 34. Besides, the transceiver 40 further comprises the ADCs 48 and 58 for respectively converting the corrected in-phase and quadrature-phase analog signals $I_t'$ and $Q_t'$ to corresponding in-phase and quadrature-phase digital signals. In the end, a digital signal processor (DSP) 49 executes the digital signal processing on the in-phase and quadrature-phase digital signals.

Figure 3:
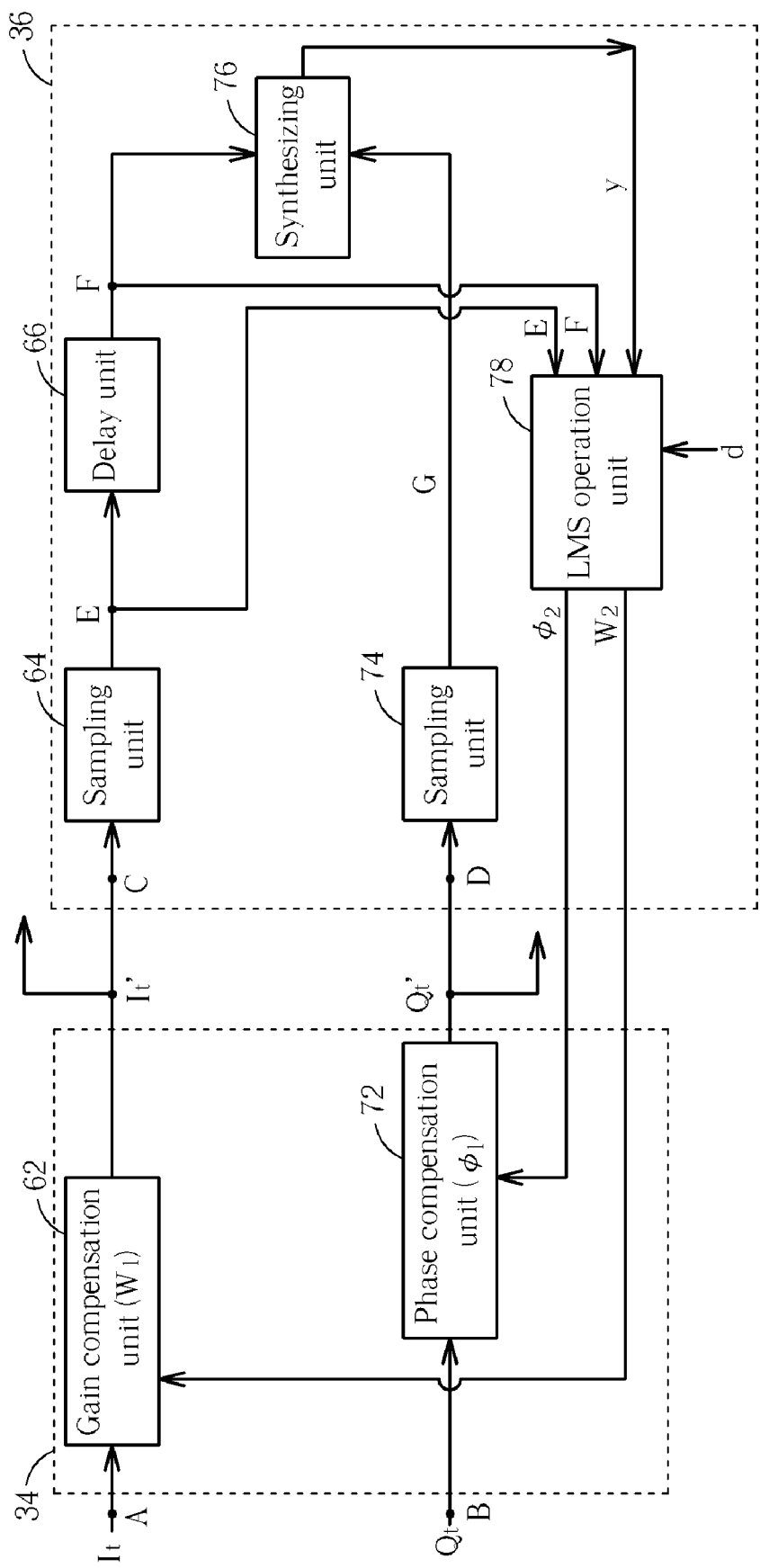
FIG. 3 is a diagram of the calibration unit and the operation unit of FIG. 2.

Please refer to FIG. 3. FIG. 3 is a diagram showing the calibration unit 34 and the operation unit 36 of FIG. 2. In this embodiment, the calibration unit 34 comprises a programmable gain compensation unit 62 and a programmable phase compensation unit 72. The operation unit 36 comprises sampling units 64 and 74, a delay unit 66, a synthesizing unit 76, and an LMS operation unit 78.

The programmable gain compensation unit 62 utilizes an initial gain compensating value $\omega_1$ to adjust the gain of the in-phase analog signal It and outputs the corrected in-phase analog signal $I_t'$. The programmable phase compensation unit 72 utilizes an initial phase compensating value $\psi_1$ to adjust the phase of the quadrature-phase analog signal $Q_t$ and outputs the corrected quadrature-phase analog signal $Q_t'$. Although the gain of the in-phase analog signal It and the phase of the quadrature-phase analog signal Qt are respectively adjusted in this embodiment for calibrating IQ mismatch between the in-phase and quadrature-phase analog signals $I_t$ and $Q_t$, those skilled in the art easily appreciate that IQ mismatch can be calibrated by only adjusting the gain and phase of one of the in-phase and quadrature-phase analog signals $I_t$ and $Q_t$.

Please refer to FIG. 3. The sampling units 64 and 74 sample the corrected in-phase analog signal $I_t'$ and the corrected quadrature-phase analog signal $Q_t'$ and thus generate two sampling signals E, G, respectively. The sampling frequency is at least two times the frequency of the sampled signals (i.e., the corrected in-phase and quadrature-phase analog signals $I_t'$ and $Q_t'$). In this embodiment, the sampling frequency is four times the frequency of the sampled signals, but not limited to that. Otherwise, the delay unit 66 delays the sampling signal E for a quarter of its period in this embodiment, so as to generate a delay signal F. The synthesizing unit 76, an adder in this embodiment, synthesizes the delay signal F and the sampling signal G and thus generate a synthesized signal Y inputted into the least mean square (LMS) operation unit 78. The LMS operation unit 78 generates an error signal $\epsilon$ according to the synthesized signal Y and an error toleration threshold value d, wherein the error toleration threshold value d represents the tolerable amount of error for adjusting the synthesized signal Y during executing the LMS algorithm. In this embodiment, zero is set to the error toleration threshold value d. Additionally, the delay signal F and the sampling signal E are used for generating the input parameters $X_1$ and $X_2$ which are necessary for executing the LMS algorithm. Consequently, the LMS operation unit 78 generates a gain compensating value $\omega_2$ to update the initial gain compensating value $\omega_1$ of the programmable gain compensation unit 62, and generates a phase compensating value $\psi_2$ to update the initial phase compensating value $\psi_1$ of the programmable phase compensation unit 72 according to the delay signal F, the sampling signal E, and the error signal $\epsilon$. Hence, by utilizing the calibration unit 34 and the operation unit 36, the corrected analog in-phase signal $I_t'$ and the corrected analog quadrature-phase signal $Q_t'$ are generated with the same amplitude and orthogonal characteristic.

The operation of the operation unit 36 is further described as follows.

The RF signal $V_{RF}$ received by the Antenna 41 is:

$V_{RF}=\sin(w_{LO}t+w_mt+\theta_0)$, wherein frequencies $\omega_{LO}$, $\omega_m$ are known values.

The first and the second carrier wave received by the mixers 44 and 54 are:

$C_I=\sin(w_{LO}t)$ $C_Q=(1+\epsilon_1)*\cos(w_{LO}t+\delta_1)$

, wherein $\epsilon_1$ represents the gain mismatch between the carrier signals $C_I$, $C_Q$, and $\delta_1$ represents the phase mismatch between the carrier signals $C_I$, $C_Q$.

Consequently, the in-phase analog signal $I_t$ and the quadrature-phase analog signal $Q_t$ respectively corresponding to the formulas 1 and 2 shown below are generated by down converting the RF signal $V_{RF}$ according to carrier signals $C_I$ and $C_Q$, respectively.

$I_t=\cos(w_mt+\theta_0)$ (formula 1)

$Q_t=-(1+\epsilon_1)\sin(w_mt+\theta_0-\delta_1)$ (formula 2)

The corrected in-phase analog signal $I_t'$ and the corrected quadrature-phase analog signal $Q_t'$ respectively corresponding to the formulas 3 and 4 shown below are generated by executing the gain and phase compensation on the in-phase analog signal $I_t$ and the quadrature-phase analog signal $Q_t$, respectively. The parameter W of formula 3 represents the gain compensating value offered by the programmable gain compensation unit 62, and the parameter $\psi$ of formula 4 represents the phase compensating value offered by the programmable phase compensation unit 72 during calibration.

$I_t'=W*\cos(w_mt+\theta_0)$ (formula 3)

$Q_t'=-(1+\epsilon_1)\sin(w_mt+\theta_0-\delta_1+\phi)$ (formula 4)

Formula 5 shown below represents that the corrected in-phase signal $I_t'$ is sampled within time t according to a period $T_0$, so as to generate k sampled values and output the sampling signal E(k). Formula 6 shown below means that the sampling signal E(k) is delayed by a period $T_0$, wherein $T_0$ is a quarter of $2\pi/\omega_m$ and thereby the cosine function is translated into the sine function in formula 6.

$E(k)=W*\cos(w_mkT_0+\theta_0)$, where $t=k*T_0$ (formula 5)

$F(k)=W*\cos[w_m(k-1)T_0+\theta_0]=W*\sin(w_mkT_0+\theta_0)$ (formula 6)

Formulas 7, 8, and 9 are shown below, wherein formula 7 represents that quadrature-phase signal $Q_t'$ is sampled within time t according to a period $T_0$, so as to generate k sampled values and output the sampling signal G(k). Formula 8 means that the sampling signal G(k) and the delay signal F(k) are synthesized to form a synthesized signal y(t). As for formula 9, d(t) represents the toleration error threshold value for executing the LMS algorithm so that the tolerable amount of error is set for calibrating the phase and gain mismatch.

$G(k)=-(1+\epsilon_1)\sin(w_mkT_0+\theta_0-\delta_1+\phi)$, where $t=k*T_0$ (formula 7)

$y(t)=G(k)+F(k)=W*\sin(w_mkT_0+\theta_0)-(1+\epsilon_1)\sin(w_mkT_0+\theta_0-\delta_1+\phi)$ (formula 8)

$\epsilon(t)=d(t)-y(t)=-W*\sin(w_mkT_0+\theta_0)-(1+\epsilon_1)\sin(w_mkT_0+\theta_0-\delta_1+\phi)$, where $d(t)=0$ (formula 9)

The parameters $X_1(k)$ and $X_2(k)$ shown in formulas 10 and 11 are necessary for executing the LMS algorithm. According to formulas 10 and 11, it is obvious that the parameter $X_1(k)$ is the inversion of the delay signal F(k) and the parameter $X_2(k)$ is the sampling signal E(k).

$$X_2(k) = \frac{\partial \varepsilon(k)}{\partial \phi} = \cos(w_m k T_0 + \theta_0 - \delta_1 + \phi) \quad \text{(formula 10)}$$

$$\cong W * \cos(w_m k T_0 + \theta_0) = E(k),$$

where $\psi$ is less than 1

$$X_1(k) = \frac{\partial \varepsilon(k)}{\partial W} = -\sin(w_m k T_0 + \theta_0) = -F(k) \quad \text{(formula 11)}$$

As shown below, formula 12 and formula 13 are known for executing LMS algorithm such that the operation unit 36 performs the LMS operation to calibrate the gain and the phase mismatch.

$$W(k+1)=W(k)+2\mu*\text{sign}[-y(k)]*\text{sign}[-F(k)] \quad \text{(formula 12)}$$

$$\phi(k+1)=\phi(k)+2\mu*\text{sign}[-y(k)]*\text{sign}[E(k)] \quad \text{(formula 13)}$$

Please note that the transceiver of the present invention can also send a test signal from the transmitter to the receiver of the transceiver before communicating with the remote communication system, so as to execute the phase and gain compensation in advance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for calibrating in-phase and quadrature-phase (IQ) mismatch in a direct down-conversion circuit of a communication system, the method comprising: generating an in-phase analog signal and a quadrature-phase analog signal according to an RF signal, utilizing a first mixer and a second mixer, respectively; generating, with a first sampling circuit, a first reference signal according to the in-phase analog signal; generating, with a second sampling circuit, a second reference signal according to the quadrature-phase signal; delaying the first reference signal by a predetermined period utilizing a delay circuit, and thus generating a first delay signal; generating, with a synthesizing device, a synthesized signal according to the first delay signal and the second reference signal; executing, with an algorithm operation device, a predetermined algorithm on the synthesized signal, the first reference signal, and the first delay signal to thereby output a compensation signal; wherein executing the predetermined algorithm further comprises executing a least mean squares (LMS) algorithm on the synthesized signal, the first reference signal, and the first delay signal according to an error threshold limit value, so as to thereby output the compensation signal; and utilizing a calibrating device for calibrating IQ mismatch between the in-phase analog signal and the quadrature-phase analog signal according to the compensation signal.

2. The method of claim 1, wherein the step of generating the in-phase and quadrature-phase analog signals further comprises:
mixing the RF signal with a first carrier signal, so as to generate a first mixing signal;
filtering the first mixing signal and thus generating the in-phase analog signal;
mixing the RF signal with a second carrier signal, so as to generate a second mixing signal; and
filtering the second mixing signal and thus generating the quadrature-phase analog signal.

3. The method of claim 1, wherein the step of generating the compensation signal further comprises:
respectively sampling the in-phase analog signal and the quadrature-phase analog signal according to a sampling frequency and thereby generating the first reference signal and the second reference signal.

4. The method of claim 3, wherein the sampling frequency is at least four times the frequency of the in-phase analog signal or the quadrature-phase analog signal.

5. The method of claim 1, wherein the predetermined period corresponds to the sampling frequency such that the first delay signal is orthogonal to the first sampling signal.

6. The method of claim 1, wherein the compensation signal comprises at least one of a phase compensation signal and a gain compensation signal.

7. The method of claim 6, wherein the step of calibrating IQ mismatch between the in-phase analog signal and the quadrature-phase analog signal further comprises:
executing at least one of a phase compensation or a gain compensation according to at least one of the phase compensation signal and the gain compensation signal.

8. The method of claim 7, further comprising:
adjusting, with a phase compensation device, at least one of the phases of the in-phase and quadrature-phase analog signals during executing the phase compensation; and
adjusting, with a gain compensation device, at least one of the amplitudes of the in-phase and quadrature-phase analog signals during executing the gain compensation.

9. The method of claim 1, further comprising:
after calibrating the IQ mismatch between the in-phase analog signal and the quadrature-phase analog signal:
converting the in-phase analog signal into an in-phase digital signal with a first analog to digital converter;
converting the quadrature-phase analog signal into a quadrature-phase digital signal with a second analog to digital converter; and
executing digital signal processing on the in-phase and the quadrature-phase digital signals with a digital signal processing device.

10. A device for calibrating in-phase and quadrature-phase (IQ) mismatch, said device used in a direct down-conversion circuit of a communication system, the device comprising: a first mixer for mixing an RF signal with a first carrier signal, so as to generate an in-phase analog signal; a second mixer for mixing the RF signal with a second carrier signal, so as to generate a quadrature-phase analog signal; a first sampling unit for sampling the in-phase analog signal according to a sampling frequency, so as to generate a first sampling signal; a second sampling unit for sampling the quadrature-phase analog signal according to the sampling frequency, so as to generate a second sampling signal; a delay unit for generating a first delay signal according to the first sampling signal and a predetermined period; a synthesizing unit for generating a synthesized signal according to the first delay signal and the second sampling signal; an algorithm operation unit for generating a compensation signal by executing a predetermined algorithm according to the synthesized signal, the first sampling signal and the first delay signal; wherein the algorithm operation unit is a least mean squares (LMS) operation unit for executing an LMS algorithm on the synthesized signal, the first sampling signal, and the first delay signal according to an error threshold limit value, so as to thereby generate the compensation signal; and a calibration unit for calibrating the IQ mismatch between the in-phase analog signal and the quadrature-phase analog signal according to the compensation signal.

11. The device of claim 10, further comprising:

an antenna for receiving the RF signal;

a first low pass filter (LPF) for filtering out a high frequency component of the in-phase analog signal; and a second LPF for filtering out a high frequency component of the quadrature-phase analog signal.

12. The device of claim 10, wherein the predetermined period corresponds to the sampling frequency such that the first delay signal and the first sampling signal are orthogonal to each other.

13. The device of claim 10, wherein the sampling frequency is at least four times the frequency of the in-phase or quadrature-phase analog signal.

14. The device of claim 10, wherein the compensation signal comprises at least one of a phase compensation signal and a gain compensation signal.

15. The device of claim 14, wherein the calibration unit further comprises:

a phase compensation unit for adjusting at least one of the phases of the in-phase and quadrature-phase analog signals according to the phase compensation signal during executing the phase compensation; and a gain compensation unit for adjusting at least one of the amplitudes of the in-phase and quadrature-phase analog signals according to the gain compensation signal during executing the gain compensation.

16. The device of claim 15, wherein the phase compensation unit executes phase compensation on the quadrature-phase analog signal.

17. The device of claim 15, wherein the gain compensation unit executes gain compensation on the in-phase analog signal.

18. The device of claim 15, further comprising:

a first analog to digital converter (ADC) for generating a corresponding in-phase digital signal according to the in-phase analog signal;

a second ADC for generating a corresponding quadrature-phase digital signal according to the quadrature-phase analog signal; and a digital signal processor (DSP) for executing digital signal processing on the in-phase and the quadrature-phase digital signals.

19. The device of claim 10, wherein the IQ mismatch calibration device is applied to a transceiver.

20. The device of claim 19, wherein the RF signal is a test signal outputted from a transmitter of the transceiver and then received by a receiver of the transceiver.

* * * * *